United States Patent
Kobayashi et al.

(10) Patent No.: US 7,336,711 B2
(45) Date of Patent: Feb. 26, 2008

(54) IMAGE ENCODING METHOD, IMAGE DECODING METHOD, IMAGE ENCODER, IMAGE DECODE, PROGRAM, COMPUTER DATA SIGNAL, AND IMAGE TRANSMISSION SYSTEM

(75) Inventors: Mitsuru Kobayashi, Yokohama-shi (JP); Shunichi Sekiguchi, Yamato-shi (JP); Satoru Adachi, Yokohama-shi (JP)

(73) Assignee: NTT DoCoMo, Inc., Tokyo (JP)

( * ) Notice: Subject to any disclaimer, the term of this patent is extended or adjusted under 35 U.S.C. 154(b) by 746 days.

(21) Appl. No.: 10/476,145

(22) PCT Filed: Nov. 18, 2002

(86) PCT No.: PCT/JP02/12013

§ 371 (c)(1),
(2), (4) Date: Oct. 28, 2003

(87) PCT Pub. No.: WO03/043347

PCT Pub. Date: May 22, 2003

(65) Prior Publication Data

US 2004/0179601 A1   Sep. 16, 2004

(30) Foreign Application Priority Data

Nov. 16, 2001   (JP) .............................. 2001-352379

(51) Int. Cl.
*H04N 7/18* (2006.01)
(52) U.S. Cl. .............................. 375/240.23; 375/240.26
(58) Field of Classification Search ................. 375/240.01–240.29
See application file for complete search history.

(56) References Cited

U.S. PATENT DOCUMENTS 6,765,964 B1 * 7/2004 Conklin ................. 375/240.14

(Continued)

FOREIGN PATENT DOCUMENTS

CN   1225777 A   8/1999

(Continued)

OTHER PUBLICATIONS

Yoshimitsu Kuroki: "Laplace bunpu ni motozuku JPEG tokei model no jotai wariate" ITE Technical Report, vol. 23, No. 79, pp. 55-60 Dec. 31, 1999.

(Continued)

*Primary Examiner*—Anand S. Rao
(74) *Attorney, Agent, or Firm*—Oblon, Spivak, McClelland, Maier & Neustadt, P.C.

(57) ABSTRACT

A motion of an image in a block is detected with respect to image data D1, a coding mode to be applied thereto is selected among a plurality of prepared coding modes, and motion compensation is performed for the image data (Step S101). Then, an orthogonal transform coefficient D6 and coding mode information D3 undergo variable-length coding to generate coded data D7 (Step S103). Subsequently, in the variable-length coding of the coding mode information, a probability table for use in arithmetic coding is switched for each of binarization codes included in a binarization pattern of the coding mode information with reference to a coding mode selected in a block adjacent to the block. Thus, the image coding method, image decoding method, image coding apparatus, image decoding apparatus, program, computer data signal, and image transmission system, which are capable of enhancing efficiency of data compression for coding mode information multiplexed on coded data, are realized.

31 Claims, 18 Drawing Sheets

| CHARACTER | APPEARANCE PROBABILITY | SECTION ON NUMBER LINE |
|---|---|---|
| A | 1/10 | [0.00, 0.10) |
| C | 1/10 | [0.10, 0.20) |
| E | 1/10 | [0.20, 0.30) |
| H | 1/10 | [0.30, 0.40) |
| I | 2/10 | [0.40, 0.60) |
| M | 1/10 | [0.60, 0.70) |
| R | 1/10 | [0.70, 0.80) |
| T | 2/10 | [0.80, 1.00) |

U.S. PATENT DOCUMENTS

| | | | |
|---|---|---|---|
| 6,839,386 B2 * | 1/2005 | Sato et al. | 375/240.25 |
| 2004/0028282 A1 * | 2/2004 | Kato et al. | 382/236 |
| 2004/0081238 A1 * | 4/2004 | Parhy | 375/240.16 |
| 2004/0131268 A1 * | 7/2004 | Sekiguchi et al. | 382/238 |

FOREIGN PATENT DOCUMENTS

| | | |
|---|---|---|
| JP | 2000-308054 | 11/2000 |
| WO | WO 98/20680 | 5/1998 |

OTHER PUBLICATIONS

VCEG-M10 H.26L Test Model Long Term No. 8 (TML-8) draft0 Jul. 30, 2003.

Detlev Marpe, et al., "Further Results for CABAC entropy coding scheme", ITU-Telecommunications Standardization Sector, Study Group 16 Question 6, Video Coding Experts Group (VCEG), Apr. 2-4, 2001, pp. 1-8.

* cited by examiner

*Fig.1*

| CHARACTER | APPEARANCE PROBABILITY | SECTION ON NUMBER LINE |
|---|---|---|
| A | 1/10 | [0.00,0.10) |
| C | 1/10 | [0.10,0.20) |
| E | 1/10 | [0.20,0.30) |
| H | 1/10 | [0.30,0.40) |
| I | 2/10 | [0.40,0.60) |
| M | 1/10 | [0.60,0.70) |
| R | 1/10 | [0.70,0.80) |
| T | 2/10 | [0.80,1.00) |

Fig.3

| CODE WORD | PROBABILITY TABLE ||| OUTPUT |
|---|---|---|---|---|
| | LOWER LIMIT | UPPER LIMIT | SECTION LENGTH | |
| 0.0757451536 | 0.0 | 0.1 | 0.1 | A |
| 0.757451536 | 0.7 | 0.8 | 0.1 | R |
| 0.57451536 | 0.4 | 0.6 | 0.2 | I |
| 0.8725768 | 0.8 | 1.0 | 0.2 | T |
| 0.362884 | 0.3 | 0.4 | 0.1 | H |
| 0.62884 | 0.6 | 0.7 | 0.1 | M |
| 0.2884 | 0.2 | 0.3 | 0.1 | E |
| 0.884 | 0.8 | 1.0 | 0.2 | T |
| 0.42 | 0.4 | 0.6 | 0.2 | I |
| 0.1 | 0.1 | 0.2 | 0.1 | C | mode0
Skip mode1
Inter
16 × 16 mode2
Inter
16 × 8 mode3
Inter
8 × 16 mode4
Inter
8 × 8 mode5
Inter
3 × 4 mode6
Inter
4 × 8 mode7
Inter
4 × 4 mode8
Intra
4 × 4 mode9
Intra
16 × 16

Fig. 8A

HORIZONTAL COORDINATES →

VERTICAL COORDINATES ↓

| $a_{11}$ | $a_{12}$ | $a_{13}$ | $a_{14}$ |
|---|---|---|---|
| $a_{21}$ | $a_{22}$ | $a_{23}$ | $a_{24}$ |
| $a_{31}$ | $a_{32}$ | $a_{33}$ | $a_{34}$ |
| $a_{41}$ | $a_{42}$ | $a_{43}$ | $a_{44}$ |

Fig. 8B

HORIZONTAL FREQUENCIES →

VERTICAL FREQUENCIES ↓

| $f_{11}$ | $f_{12}$ | $f_{13}$ | $f_{14}$ |
|---|---|---|---|
| $f_{21}$ | $f_{22}$ | $f_{23}$ | $f_{24}$ |
| $f_{31}$ | $f_{32}$ | $f_{33}$ | $f_{34}$ |
| $f_{41}$ | $f_{42}$ | $f_{43}$ | $f_{44}$ |

HORIZONTAL FREQUENCIES →

VERTICAL FREQUENCIES ↓

| 10 | 0 | -1 | 0 |
|----|---|----|---|
| 2  | 0 | 0  | 0 |
| 0  | 1 | 0  | 0 |
| 0  | 0 | 0  | 0 |

| $f_{11}$ | $f_{12}$ | $f_{21}$ | $f_{31}$ | $f_{22}$ | $f_{13}$ | $f_{14}$ | $f_{23}$ | $f_{32}$ | $f_{41}$ | $f_{42}$ | $f_{33}$ | ..... |
|---|---|---|---|---|---|---|---|---|---|---|---|---|
| 10 | 0 | 2 | 0 | 0 | -1 | 0 | 0 | 1 | 0 | 0 | 0 | ..... |

$S_1$    $S_2$         $S_3$                $S_4$                $S_5$

| COEFFICIENT GROUP | LEVEL | RUN |
|---|---|---|
| $S_1$ | 10 | 0 |
| $S_2$ | 2 | 1 |
| $S_3$ | -1 | 2 |
| $S_4$ | 1 | 2 |
| $S_5$ | 0 | — |

Fig.12

| CODING MODE | | BINARIZATION PATTERN | | | | |
|---|---|---|---|---|---|---|
| 0 | Skip | 0 | | | | |
| 1 | Inter 16×16 | 1 | 0 | 0 | | |
| 2 | Inter 16×8 | 1 | 0 | 1 | | |
| 3 | Inter 8×16 | 1 | 1 | 0 | 0 | 0 |
| 4 | Inter 8×8 | 1 | 1 | 0 | 0 | 1 |
| 5 | Inter 8×4 | 1 | 1 | 0 | 1 | 0 |
| 6 | Inter 4×8 | 1 | 1 | 0 | 1 | 1 |
| 7 | Inter 4×4 | 1 | 1 | 1 | 0 | 0 |
| 8 | Intra 4×4 | 1 | 1 | 1 | 0 | 1 |
| 9 | Intra 16×16 | 1 | 1 | 1 | 1 | 0 |
| Bin_no. | | 1 | 2 | 3 | 4 | 5 |

*Fig.14*

| CODING MODE | mode0 | mode1 | mode2 | mode3 | mode4 |
|---|---|---|---|---|---|
| | Skip | Inter 16×16 | Inter 16×8 | Inter 8×16 | Inter 8×8 |
| COMPLEXITY | 0 | 2 | 3 | 3 | 4 |
| CODING MODE | mode5 | mode6 | mode7 | mode8 | mode9 |
| | Inter 8×4 | Inter 4×8 | Inter 4×4 | Intra 4×4 | Intra 16×16 |
| COMPLEXITY | 5 | 5 | 6 | 7 | 1 |

*Fig.16*

|  | Foreman QP=24 | Stefan QP=24 | Stefan QP=16 |
|---|---|---|---|
| CONVENTIONAL | 27522 | 32991 | 33090 |
| PRESENT INVENTION | 26675 | 31824 | 31900 |
| DECREASE RATIO | -3.08% | -3.54% | -3.60% |

Fig.17

| CODING MODE | | BINARIZATION PATTERN | | | | | |
|---|---|---|---|---|---|---|---|
| 0 | Skip | 0 | | | | | |
| 1 | Inter 16×16 | 1 | 0 | | | | |
| 2 | Inter 16×8 | 1 | 1 | 0 | 0 | | |
| 3 | Inter 8×16 | 1 | 1 | 0 | 1 | | |
| 4 | Inter 8×8 | 1 | 1 | 1 | 0 | 0 | 0 |
| 5 | Inter 8×4 | 1 | 1 | 1 | 0 | 0 | 1 |
| 6 | Inter 4×8 | 1 | 1 | 1 | 0 | 1 | 0 |
| 7 | Inter 4×4 | 1 | 1 | 1 | 0 | 1 | 1 |
| 8 | Intra 4×4 | 1 | 1 | 1 | 1 | 0 | |
| 9 | Intra 16×16 | 1 | 1 | 1 | 1 | 1 | |
| Bin_no. | | 1 | 2 | 3 | 4 | 5 | 6 |

IMAGE ENCODING METHOD, IMAGE DECODING METHOD, IMAGE ENCODER, IMAGE DECODE, PROGRAM, COMPUTER DATA SIGNAL, AND IMAGE TRANSMISSION SYSTEM

TECHNICAL FIELD

The present invention relates to an image coding method, an image decoding method, an image coding apparatus an image decoding apparatus, a program, and a computer data signal which can be suitably applied to an image transmission system such as a mobile video transmission system, and relates to an image transmission system.

BACKGROUND ART

As a coding method for a moving picture, standard moving picture coding methods such as ITU-T H.26x and MPEG series have been heretofore known. In these image coding methods, motion compensation (MC) inter-frame prediction between a frame image inputted as an object to be coded and other frame images is performed, and image data is converted to a motion vector and a difference (a prediction residual) frame image. By such a motion compensation, it is possible to remove a redundancy as to a time change from the frame image that is an object to be coded, and efficiency of data compression by image coding is enhanced.

The difference frame image that is image data generated by the motion compensation undergoes orthogonal transform and variable-length coding, and becomes coded data that is compressed data used for an image transmission. As one of variable-length coding methods described above, arithmetic coding (AC) has been used.

In general, in the case of carrying out the arithmetic coding of an information source string (symbol string) formed by combining plural types of symbols, first, certain sections are allocated to the respective symbols in accordance with the appearance probabilities of the symbols on a number line (probability number line) of [0.0, 1.0). In this case, one representing correspondence relationships between the symbols and the sections on the number line is called a probability table. When the information source string undergoes the variable-length coding by the arithmetic coding, code words expressing the information source string on the number line is generated by referring to this probability table.

Here, the arithmetic coding will be described with reference to FIGS. 1 to 3. Specifically, a character string "ARITHMETIC" will be cited as the information source string to be coded, and the arithmetic coding thereof will be exemplified.

Eight types of characters (symbols), which are A, C, E, H, I, M, R and T, appear in the above-described information source string. As shown in the table of FIG. 1, sections are allocated to these characters on the number line (probability number line) of [0.0, 1.0) such that section lengths proportional to the appearance probabilities of the respective characters in the character string can be obtained. The table shown in FIG. 1, which represents these correspondence relationships between the characters and the sections on the number line, becomes a probability table for use in the arithmetic coding.

FIG. 2 is a diagram illustrating the coding of the character string "ARITHMETIC" by use of the probability table shown in FIG. 1. In the arithmetic coding, a section reduction operation based on the probability table is sequentially carried out for the respective symbols included in the information source string, thus generating code words formed by coding the information source string.

In the example shown in FIG. 2, first, the probability table shown in FIG. 1 is referred to for the first character "A" of the character string "ARITHMETIC" to be coded, and the section [0, 1) on the number line is divided into eight sections corresponding to the respective characters. Then, the section is reduced to the section [0.0, 0.1) corresponding to the character "A" among the eight sections. Next, the probability table is referred to for the second character "R", and the section [0.0, 0.1) is divided into eight sections. Subsequently, among these sections, the section is reduced to the section [0.07, 0.08) corresponding to the character "R".

Hereinafter, the coding operations by the section reduction are carried out sequentially for each of the characters. Then, in the section [0.0757451536, 0.0757451552) on the number line finally obtained, a numerical value "0.0757451536" within the section is generated as a code word obtained by performing the arithmetic coding of the character string "ARITHMETIC".

FIG. 3 is a table showing decoding of the code word "0.0757451536" obtained by use of the probability table shown in FIG. 1 to the character string "ARITHMETIC".

In the example shown in FIG. 3, the probability table shown in FIG. 1 is referred to for the code word "0.0757451536" to be decoded, and the section [0.0, 0.1) having a section length of 0.1 in which the code word is included is specified. Then, the character "A" corresponding to the specified section is outputted as the first character, and a new code word "0.75.7451536" is generated by (code word—lower limit)/(section length). Next, the probability table is referred to for the code word "0.757451536", and a section [0.7, 0.8) having a section length of 0.1 in which the code word is included is specified. Then, the character "R" corresponding to the specified section is outputted as the second character, and a new code word "0.57451536" is generated.

Hereinafter, the decoding operations are sequentially carried out for the code words. Then, the character string "ARITHMETIC" is restored from the code word "0.0757451536" which underwent the arithmetic coding.

As described above, in the variable-length coding of the information source string by use of the arithmetic coding, the symbols included in the information source string and the sections on the number line are allowed to correspond to each other, thus making it possible to express an arbitrary information source string by the code words on the number line of [0.0, 1.0). Moreover, the probability table allowing the symbols and the sections to correspond to each other is set in accordance with the appearance probabilities of the respective symbols, whereby the variable-length coding of the information source string can be performed effectively and the efficiency of data compression by the coding can be enhanced.

DISCLOSURE OF INVENTION

FIG. 4 is a flowchart illustrating an example of an image coding method using the variable-length coding by the foregoing arithmetic coding. In the image coding method shown in FIG. 4, arithmetic coding of image data is carried out by a method called CABAC (Context-based Adaptive Binary Arithmetic Coding) using context modeling which is used in ITU-T H.26L video coding system (refer to VCEG-M10 H.26L Test Model Long Term Number 8 (TML-8) draft0).

In the coding of the image data, an image to be coded is first divided into blocks having a predetermined size, and intra-frame coding, inter-frame coding, and necessary data transform processing such as an orthogonal transform including the DCT are carried out for each of the blocks. Then, image data expressing an image in each block is generated. Subsequently, the variable-length coding is carried out for the image data by use of the arithmetic coding or the like, and coded data subjected to data compression is generated.

Particularly, in the image coding method shown in FIG. 4, the coding is not carried out under conditions that are set fixedly in advance, but the context modeling is carried out when the image data for each block is coded (Step S901, Context Modeling). In the arithmetic coding using the context modeling, with regard to the probability table for use in the coding of the image data, a probability table to be applied to the image data in the block to be coded is set so as to be switched with reference to coding conditions such as processing results of image coding in blocks adjacent thereto.

When the setting of the probability table by the context modeling is terminated, the image data to be coded (for example, a plurality of DCT coefficients) is binarized, and a data string to be transmitted is generated (S902, Binarization). Then, the arithmetic coding is carried out for the binarized data string (S903, Adaptive Binary Arithmetic Coding), and the coded data is obtained.

Specifically, the probability table set by the context modeling is allocated to each bit of the binarized data string, and probability estimation is carried out (S904, Probability Estimation). Then, the data string undergoes the arithmetic coding by use of the allocated probability tables, and the code words on the number line, which are the coded data, are generated (S905, Arithmetic Coding). Moreover, information such as occurrence frequencies of the coded bits is feedbacked to the probability table based on processing results of the arithmetic coding, and thus the probability estimation is updated, and the coding trend is reflected on the probability table (S906, Probability Estimation Update).

According to the foregoing image coding method by the arithmetic coding using the context modeling, the probability table to be used is switched in accordance with the coding conditions and the processing results, thus making it possible to decrease the redundancy in the coded data.

On the other hand, when the foregoing motion compensation is performed in the image coding, there is a case where a plurality of coding modes adopting different compensation conditions and methods in the motion compensation are previously prepared, and among these coding modes, any of the coding modes applied to each image data is selected. In such a case, coding mode information indicating the selected coding mode undergoes the variable-length coding together with the image data, and is multiplexed with coded data. Accordingly, in reducing the redundancy in the coded data, it is necessary to enhance the efficiency of the data compression in the coded data by removing the redundancy also in the coding mode information.

The present invention was made to solve the foregoing problems, and an object of the present invention is to provide image coding method, image decoding method, image coding apparatus, image decoding apparatus, program, computer data signal, and image transmission system, which can enhance efficiency of data compression for coding mode information multiplexed with coded data.

To achieve the above-described object, the image coding method according to the present invention is a coding method, in which a frame image is divided into blocks of a predetermined size and image data is coded for each of the blocks, the method comprising: (1) a motion compensation step of performing motion compensation for the image data, in which a motion of an image in the block is detected in comparison of image data thereof with image data in another block in any of the frame image and another frame image, and a coding mode to be applied to the image data is selected among a plurality of coding modes prepared for the motion compensation; and (2) a coding step of generating coded data, in which coding mode information representing the selected coding mode and the image data are binarized by use of a predetermined binarization table to generate a binarization pattern, and the binarization pattern undergoes variable-length coding by arithmetic coding using a predetermined probability table, (3) wherein, in the coding step, the probability table to be applied to each of binarization codes included in the binarization pattern corresponding to the coding mode information is switched with reference to a coding mode selected in a block adjacent to the block.

Similarly, the image coding apparatus according to the present invention is a coding apparatus, in which a frame image is divided into blocks of a predetermined size and image data is coded for each of the blocks, the apparatus comprising: (1) motion compensation means for performing motion compensation for the image data, in which a motion of an image in the block is detected in comparison of image data thereof with image data in another block in any of the frame image and another frame image, and a coding mode to be applied to the image data is selected among a plurality of coding modes prepared for the motion compensation; and (2) coding means for generating coded data, in which coding mode information representing the selected coding mode and the image data are binarized by use of a predetermined binarization table to generate a binarization pattern, and the binarization pattern undergoes variable-length coding by arithmetic coding using a predetermined probability table, (3) wherein the coding means switches the probability table to be applied to each of binarization codes included in the binarization pattern corresponding to the coding mode information with reference to a coding mode selected in a block adjacent to the block.

Similarly, the image coding program according to the present invention is a program for causing a computer to execute the above-mentioned image coding method. Further, the computer data signal according to the present invention is a data signal embodied in carrier wave for carrying an image coding program for causing a computer to execute the above-mentioned image coding method.

In the foregoing image coding method, apparatus, program, and computer data signal, the coding mode to be applied to the motion compensation is selected among the plurality of coding modes different in coding conditions and methods therein, and the motion compensation is performed. Then, the image data subjected to the motion compensation and the coding mode information representing the coding mode applied to the motion compensation undergo the arithmetic coding to be multiplexed on each other, and the coded data subjected to the data compression is generated. Then, in the arithmetic coding of the coding mode information, the probability table is switched for each of the binarization codes included in the binarization pattern obtained by binarizing the coding mode information with reference to processing results in the adjacent blocks, and the arithmetic coding is carried out.

In such a manner, the code position of each of the binarization codes in the binarization pattern, the coding mode selected in the adjacent block and the like are reflected on the coding conditions in the arithmetic coding. Accordingly, the redundancy of the coding mode information is removed effectively, thus making it possible to enhance the efficiency of the data compression in the coded data.

Moreover, the image decoding method according to the present invention is a decoding method, in which a frame image is divided into blocks of a predetermined size and coded data obtained by coding image data for each of the blocks is decoded, the method comprising: (1) a decoding step of generating coding mode information and image data of an image in the block, in which the coded data undergoes variable-length decoding by inverse arithmetic coding using a predetermined probability table to generate a binarization pattern, and the binarization pattern is debinarized by use of a predetermined binarization table; and (2) a motion compensation step of performing motion compensation for the image data, in which a coding mode selected among a plurality of coding modes prepared for the motion compensation is applied to the image data, the coding mode being represented by the coding mode information; (3) wherein, in the decoding step, the probability table to be applied to each of binarization codes included in the binarization pattern corresponding to the coding mode information is switched with reference to a coding mode selected in a block adjacent to the block.

Similarly, the image decoding apparatus according to the present invention is a decoding apparatus, in which a frame image is divided into blocks of a predetermined size and coded data obtained by coding image data for each of the blocks is decoded, the apparatus comprising: (1) decoding means for generating coding mode information and image data of an image in the block, in which the coded data undergoes variable-length decoding by inverse arithmetic coding using a predetermined probability table to generate a binarization pattern, and the binarization pattern is debinarized by use of a predetermined binarization table; and (2) motion compensation means for performing motion compensation for the image data, in which a coding mode selected among a plurality of coding modes prepared for the motion compensation is applied to the image data, the coding mode being represented by the coding mode information; (3) wherein the decoding means switches the probability table to be applied to each of binarization codes included in the binarization pattern corresponding to the coding mode information with reference to a coding mode selected in a block adjacent to the block.

Similarly, the image decoding program according to the present invention is a program for causing a computer to execute the above-mentioned image decoding method. Further, the computer data signal according to the present invention is a data signal embodied in carrier wave for carrying an image decoding program for causing a computer to execute the above-mentioned image decoding method.

In the foregoing image decoding method, apparatus, program, and computer data signal, the coded data subjected to the data compression undergoes the inverse arithmetic coding and the debinarization to decode the coding mode information and the image data. Then, the motion compensation is performed by applying the coding mode represented by the coding mode information. Subsequently, in the inverse arithmetic coding of the coded data, the probability table is switched for each of the binarization codes included in the binarization pattern obtained by binarizing the coding mode information with reference to the processing results in the adjacent blocks similarly to the case of the arithmetic coding described above.

In such a manner, the code position of each of the binarization codes in the binarization pattern, the coding mode selected in the adjacent block and the like are reflected on the decoding conditions in the inverse arithmetic coding. Accordingly, the redundancy of the coding mode information is removed effectively, thus making it possible to suitably restore the data from the coded data in which the efficiency of the data compression in the coded data is improved.

Moreover, in the coding method, decoding method, coding apparatus, and decoding apparatus, the plurality of coding modes preferably include two or more coding modes of performing the motion compensation, the coding modes having mutually different methods for partitioning the image in the block into motion compensation blocks.

The motion compensation block is one for imparting a motion vector for each of the motion compensation blocks obtained by partitioning a block to be coded into one or a plurality of blocks. The probability table is switched for the motion compensation block as described above with reference to the coding mode selected in the adjacent block among the foregoing plurality of coding modes including two or more coding modes different in block partition. Thus, the redundancy of the coded data is decreased in accordance with the motion compensation conditions including the method for partitioning motion compensation blocks, thus making it possible to further improve the efficiency of the data compression thereof.

Further, the plurality of coding modes preferably include a skip mode of copying an image at the same position as a reference frame for use in the motion compensation. Here, as for the skip mode, the plurality of coding modes may not include a skip mode.

Moreover, the image transmission system according to the present invention is an image transmission system, in which a frame image is divided into blocks of a predetermined size, and the frame image is transmitted by coded data obtained by coding image data for each of the blocks, the system comprising: (1) the foregoing image coding apparatus of generating the coded data from the frame image and outputting the coded data; and (2) the foregoing image decoding apparatus of receiving the coded data from the image coding apparatus and restoring the frame image.

According to the image transmission system as described above, the image can be transmitted efficiently by use of the coded data in which the efficiency of the data compression for the coding mode information multiplexed on the coded data is improved.

BRIEF DESCRIPTION OF DRAWINGS

FIG. 1 is a table showing an example of a probability table for use in the arithmetic coding.

FIG. 3 is a table showing decoding of the character string by use of the probability table shown in FIG. 1.

FIGS. 8A and 8B are diagrams illustrating an orthogonal transform of image data.

FIG. 12 is a table showing an example of a binarization table for use in binarization of coding mode information.

FIG. 14 is a table showing an example of complexities set for a plurality of coding modes shown in FIGS. 7A to 7J, respectively.

FIG. 16 is a table showing effects of decreasing code amounts by switching of a probability table for the coding mode information.

FIG. 17 is a table showing another example of the binarization table for use in the binarization of the coding mode information.

BEST MODE FOR CARRYING OUT THE INVENTION

Figure 2:
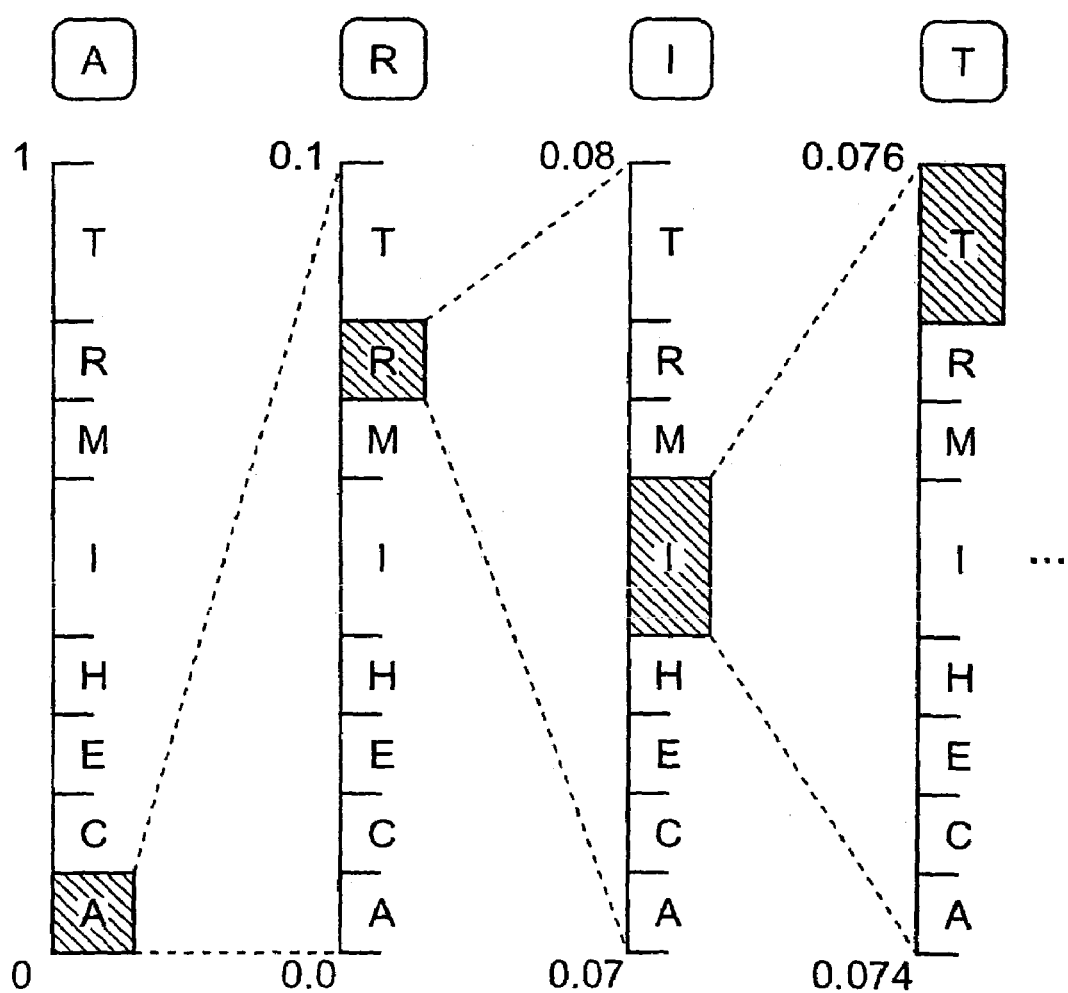
FIG. 2 is a diagram illustrating coding of a character string by use of the probability table shown in FIG. 1.

Preferred embodiments of an image coding method, an image decoding method, an image coding apparatus, an image decoding apparatus, a program, a computer data signal, and an image transmission system using the same will be described with reference to the accompanying drawings. Note that the same constituent components are denoted by the same reference numerals or the same reference symbols in descriptions of the drawings, and duplicated descriptions are omitted. Moreover, dimension ratios of the drawings are not necessarily in agreement with those in the descriptions.

First of all, the image coding method and the image coding apparatus will be described.

Figure 5:
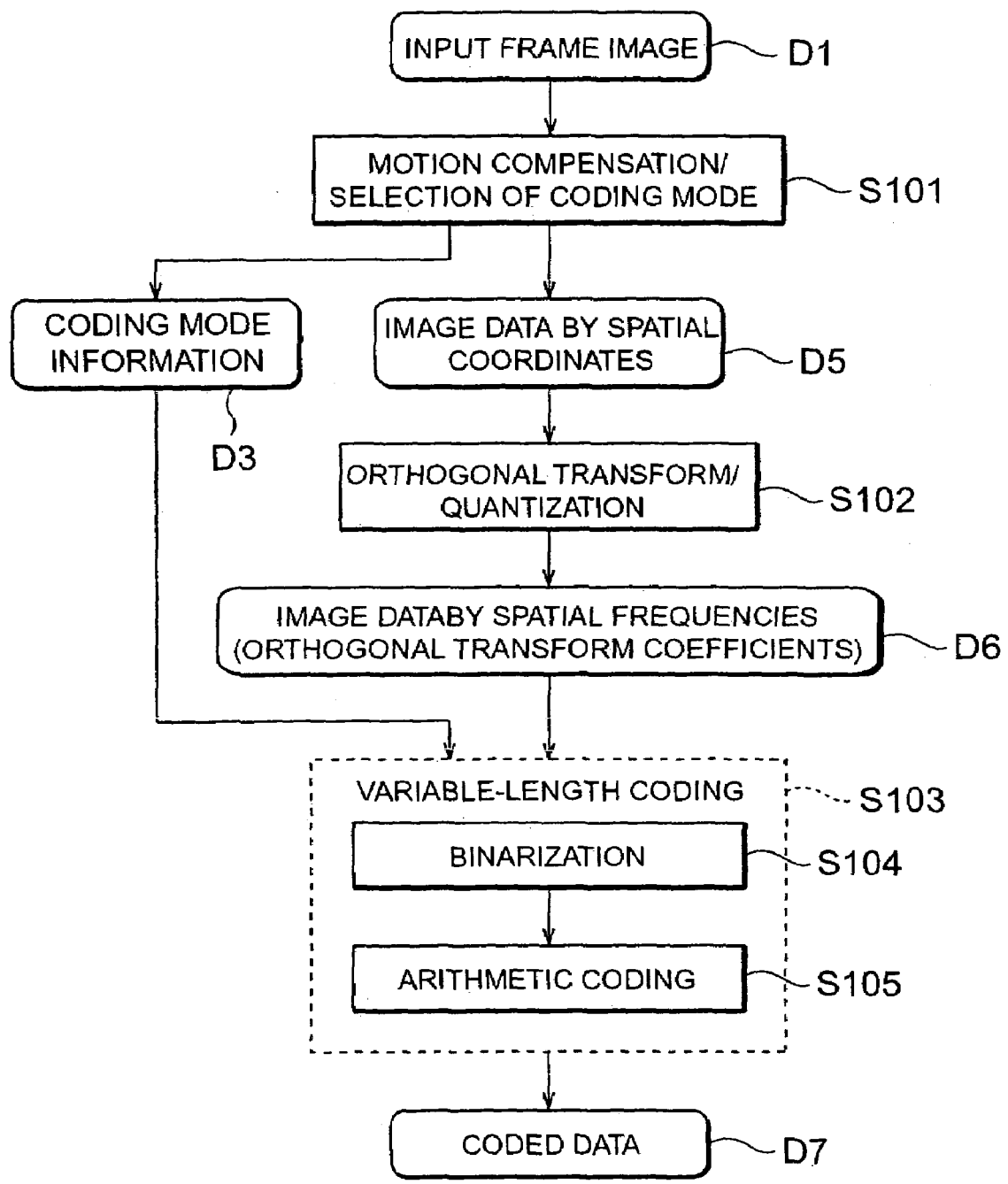
FIG. 5 is a flowchart schematically showing one embodiment of an image coding method.

FIG. 5 is a flowchart schematically illustrating one embodiment of the image coding method according to the present invention. The image coding method is a method, in which predetermined transform processing operation and coding processing operation are performed for an input frame image D1 that is a frame image in a moving picture and the like, and coded data D7 subjected to data compression, which is transmittable in an image transmission system such as a mobile video transmission system and the like, is generated.

In the image coding method shown in FIG. 5, by performing the predetermined data processing operation for the input frame image D1, the image data is transformed into image data (spatial image data) D5 represented by spatial coordinates (Step S101, motion compensation step). As the data processing operation performed herein, specifically, a motion compensation (MC) inter-frame prediction, at the time when an inter-frame coding is performed for the frame image in the moving picture, is performed. This motion compensation is performed for the image data of the image included in each block for each of blocks obtained by dividing the frame image into a predetermined size (the predetermined number of pixels).

Herein, in the image coding method of this embodiment, a plurality of coding modes, in which compensation conditions and methods in the motion compensation are different from each other, are previously prepared for the motion compensation of the frame image. In the motion compensation inter-frame prediction, the image data of a image in a certain block is compared with those of images in other blocks in the frame image or others, thus detecting the motion of the image. Based on the detection result, a coding mode applied to the image data is selected among the plurality of coding modes prepared.

Subsequently, the motion compensation of the image data is performed by application of the selected coding mode, and a motion vector and spatial image data D5 that is a difference frame image are generated. Moreover, information indicating the selected coding mode becomes coding mode information D3.

Next, an orthogonal transform operation is performed for the spatial image data D5, and a plurality of orthogonal transform coefficients D6 that are image data (frequency image data) represented by a spatial frequency are generated (Step S102, orthogonal transform step). This orthogonal transform is performed for each of the blocks obtained by dividing the frame image, and the orthogonal transform coefficients D6 are obtained for each block included in the input frame image D1. Furthermore, a quantization operation is further performed for the orthogonal transform coefficient if necessary, and an orthogonal transform coefficient (quantization coefficient) to be coded is generated.

Subsequently, variable-length coding using arithmetic coding is performed for the plurality of orthogonal transform coefficients D6, and coded data D7 that is compressed data is generated (Step S103, coding step). Furthermore, the coding mode information D3 indicating the coding mode selected for the motion compensation is also subjected to the variable-length coding by use of the arithmetic coding together with the orthogonal transform coefficients D6, and is multiplexed with coded data D7.

Specifically, the coding mode information D3 and the orthogonal transform coefficients D6 as the image data are respectively binarized by use of a predetermined binarization table, and binarization patterns are generated (Step S104, binarization step). Then, probability tables respectively applied to the binarization patterns corresponding to the coding mode information D3 and the orthogonal transform coefficients D6 are set at a predetermined probability table, and the binarization patterns are subjected to the arithmetic coding by use of the probability tables (Step S105, arithmetic coding step). Thus, the coded data D7 is generated.

Herein, in the image coding method of this embodiment, when the arithmetic coding is performed for the binarization pattern, the coding mode selected in blocks adjacent to the block to be coded is referred to for the respective binarization codes included in the binarization pattern which corresponds to the coding mode information, and the probability tables applied to the respective binarization codes are switched.

The effect of the image coding method according to this embodiment will be described.

In the image coding method shown in FIG. 5, the coding mode to be applied is selected among the plurality of coding modes in which the compensation conditions and methods in the motion compensation are different, and the motion compensation is performed. Thereafter, the image data D6 subjected to the motion compensation and the coding mode information D3 indicating the coding mode used for the motion compensation are subjected to the arithmetic coding and multiplexed, and the coded data D7 subjected to data compression is generated. Then, in the arithmetic coding of the coding mode information D3, the probability table is switched for each of the binarization codes while referring to the processing results in the adjacent blocks, the binarization codes being included in the binarization pattern in which the coding mode information D3 is binarized. Thus, the arithmetic coding is performed.

In the above described manner, by performing the context modeling in which the probability table is properly switched for each of the binarization codes in the binarization pattern corresponding to the coding mode information, the respective code positions of the binarization codes in the binarization pattern and the coding mode selected in the adjacent block are suitably reflected on the coding conditions in the arithmetic coding. Accordingly, the redundancy of the coding mode information D3 is effectively removed, thus making it possible to enhance the efficiency of the data compression in the coded data D7.

Moreover, as for the plurality of coding modes prepared for selecting the coding mode to be applied, the plurality of coding modes preferably include two or more coding modes of performing the motion compensation, the coding modes having mutually different methods for partitioning the image in the block into motion compensation blocks.

The motion compensation block is one for imparting a motion vector for each of the motion compensation blocks obtained by partitioning a block to be coded into one or a plurality of blocks. The probability table is switched for the motion compensation block as described above with reference to the coding mode selected in the adjacent block, for the foregoing plurality of coding modes including two or more coding modes different in block partition. Thus, the redundancy of the coded data is decreased in accordance with the motion compensation conditions including the method for partitioning motion compensation blocks, thus making it possible to further improve the efficiency of the data compression thereof.

Further, the plurality of coding modes preferably include a skip mode of copying an image at the same position as a reference frame for use in the motion compensation. Here, as for the skip mode, the plurality of coding modes may not include a skip mode. Note that specific coding modes, a specific method for switching the probability table and the like will be described later in detail.

Figure 6:
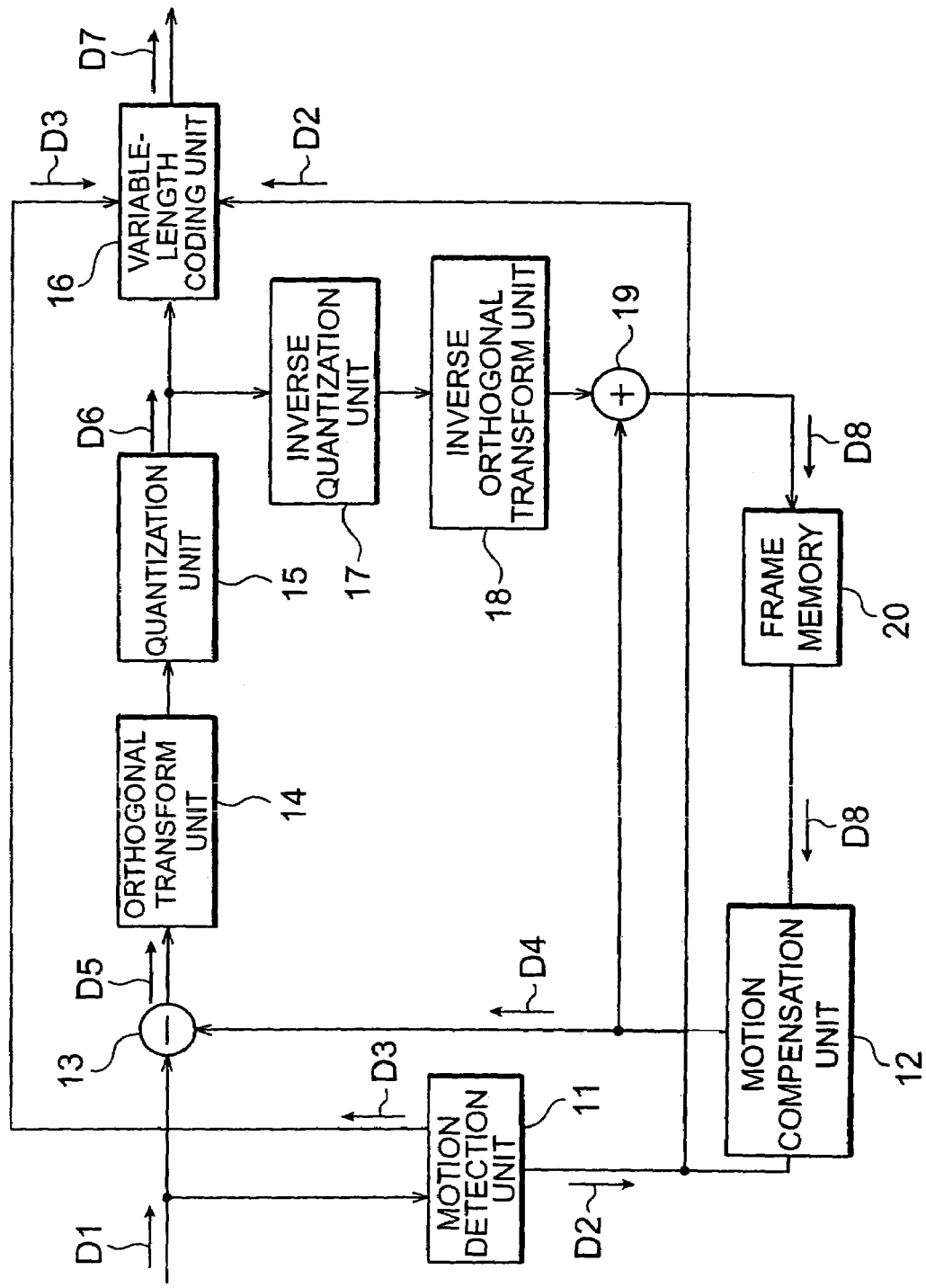
FIG. 6 is a block diagram illustrating a constitution of one embodiment of an image coding apparatus.

FIG. 6 is a block diagram illustrating a constitution of one embodiment of the image coding apparatus according to the present invention. Description will be further made below for the image coding method shown in FIG. 5 with reference to the image coding apparatus shown in FIG. 6. Note that, in the following description, a moving picture composed of time-series frame images is mainly assumed as an object to be coded with regard to the input frame image D1 inputted to the image coding apparatus. However, the image coding method and apparatus according to the present invention can be applied similarly also to a static image composed of one frame.

The input frame image D1 to be inputted as an object to be coded is first divided into square image blocks, each having a size of 16 pixels×16 lines. Each of these image blocks is an image block serving as a unit for data processing such as motion compensation, and is called a macroblock. Note that a DCT block having a size of 4 pixels×4 lines is used in the DCT (orthogonal transform) to be described later, for example, in the H.26L coding scheme. In this case, one macroblock has sixteen luma blocks and eight chroma blocks in the DCT. The image coding is carried out for each of the blocks.

The frame image D1 is inputted to motion compensation means composed of a motion detection unit 11 and a motion compensation unit 12. First, the frame image D1 is inputted to the motion detection unit 11, and the motion of the image is detected for each macroblock. The motion detection unit 11 compares the image data in the macroblock, for which the motion is to be detected, with the image data of other macroblocks in the input frame image or in other frame images, and the motion vector D2 indicating the motion of the image is detected.

Specifically, the motion detection unit 11 refers to a specified image area in the locally decoded image D8 as a frame image having been coded, the image D8 being stored in the frame memory 20. Then, the motion detection unit 11 finds out a pattern analogous to the macroblock of the input frame image D1 to be coded currently. Subsequently, the motion detection unit 11 determines the motion vector D2 by a spatial movement amount between the analogous pattern and the macroblock. Moreover, in this event, a coding mode for use in the motion compensation in the macroblock is selected from a plurality of coding modes prepared for the motion compensation.

Furthermore, in this event, the coding mode used for the motion compensation in the macroblock is selected among the plurality of coding modes prepared for the motion compensation. FIGS. 7A to 7J are schematic views illustrating examples of the coding modes prepared for the motion compensation. In the plurality of coding modes illustrated in the examples of FIGS. 7A to 7J, ten coding modes including one skip mode 0, seven inter-modes 1 to 7 and two intra-modes 8 and 9 are previously prepared for the motion compensation.

Among these coding modes, the skip mode 0 is one in which the motion of the image is not detected, and an image placed at the same position as the reference frame used for the motion compensation is copied.

Furthermore, the inter-modes 1 to 7 are ones adopted when the inter-frame coding is respectively performed by use of the different block sections of the motion compensation blocks. As to the respective motion compensation blocks, as shown in FIGS. 7B to 7H, one block with a size of 16×16 is used in the mode 1. In the mode 2, two blocks with a size of 16×8 are used. In the mode 3, two blocks with a size of 8×16 are used. In the mode 4, four blocks with a size of 8×8 are used. In the mode 5, eight blocks with a size of 8×4 are used. In the mode 6, eight blocks with a size of 4×8 are used. In the mode 7, 16 blocks with a size of 4×4 are used.

The foregoing motion vector D2 is supplied to each of the partitioned motion compensation blocks in the selected inter-mode, and hence the motion vectors D2 of the number corresponding to the number of the partitioned blocks are supplied to each macroblock. Note that the supply of the motion vector D2 to each motion compensation block is performed according to the order indicated by numerals in the blocks in each coding mode of FIGS. 7A to 7J.

Figure 7A:
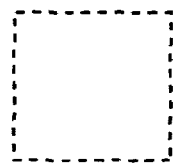
FIGS. 7A to 7J are schematic diagrams illustrating an example of coding modes for use in motion compensation.
Figure 7B:
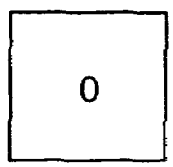
Figure 7C:
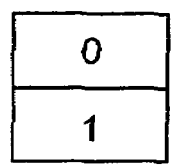
Figure 7D:
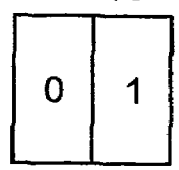
Figure 7E:
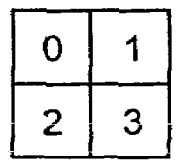
Figure 7F:
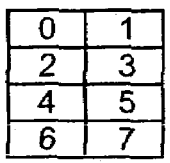
Figure 7G:
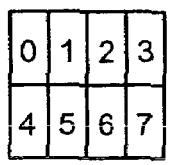
Figure 7H:
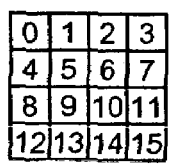
Figure 7I:
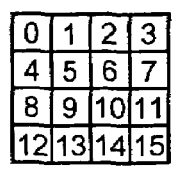
Figure 7J:
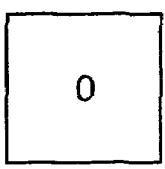

The intra-modes 8 and 9 are ones adopted when the intra-frame coding is performed by use of different block sections. As to the respective blocks, as shown in FIGS. 7I and 7J, 16 blocks with a size of 4×4 are used in the mode 8, and one block with a size of 16×16 is used in the mode 9.

When one coding mode is selected and the motion vector D2 is obtained for each motion compensation block, a motion prediction image is generated in the motion compensation unit 12 by use of the motion vector D2 from the motion detection unit 11 and a locally decoded image D8 from a frame memory 20. The motion vector D2 is determined for each of all macroblocks included in the frame image D1, and the motion prediction image is generated, whereby a prediction frame image D4 for the input frame image D1 is obtained.

Subsequently, in the subtractor 13, the difference (prediction residual) frame image D5 between the input frame image D1 and the prediction frame image D4 is generated. Moreover, in the case where the prediction frame image D4 is not prepared, the input frame image D1 is used as the frame image D5 as it is. This frame image D5 of the spatial image data becomes an object of the orthogonal transform and the arithmetic coding afterward.

The image data of the difference frame image D5 is inputted to the orthogonal transform unit (orthogonal transform means) 14. In the orthogonal transform unit 14, the orthogonal transform is carried out to the difference frame image D5 for each of orthogonal transform blocks (for example, sixteen luma blocks and eight chroma blocks) included in the macroblock. Then, orthogonal transform coefficients are generated as frequency image data. Moreover, the orthogonal transform coefficients are quantized by a predetermined quantization parameter in the quantization unit 15, and thus a final orthogonal transform coefficient (quantization coefficient) D6 that will be image data to be subjected to the arithmetic coding is obtained.

FIGS. 8A and 8B are diagrams illustrating an orthogonal transform of image data. The image data of each block divided for the purpose of the orthogonal transform in the frame image D5 is spatial image data. As exemplified by sixteen (4×4) image components in FIG. 8A, the image data is represented by 4×4 spatial image components $a_{11}$ to $a_{44}$ defined by the horizontal and vertical coordinates. The orthogonal transform unit 14 transforms the spatial image data into the image data shown in FIG. 8B by the orthogonal transform using a predetermined transform method. This image data is frequency image data, which is represented by the orthogonal transform coefficients $f_{11}$ to $f_{44}$ as 4×4 frequency image components defined by the horizontal and vertical frequencies.

As a specific orthogonal transform, for example, the discrete cosine transform (DCT) can be applied. The DCT is an orthogonal transform using a term of cosine in the Fourier transform, and is often used in the image coding. The DCT is carried out for the spatial image data, and thus the DCT coefficients $f_{11}$ to $f_{44}$ as the frequency image data are generated. Note that, as shown in FIGS. 8A and 8B, the 4×4 DCT blocks are used as blocks for the orthogonal transform in the DCT, for example, in the H.26L coding scheme.

The orthogonal transform coefficients D6 generated by the orthogonal transform unit 14 and the quantization unit 15 undergo the variable-length coding by arithmetic coding using a predetermined probability table in the variable-length coding unit (coding means) 16. Thus, the coded data D7 as the compressed data of the input frame image D1 is generated.

Moreover, in addition to the orthogonal transform coefficients D6, the motion vector D2 detected by the motion detection unit 11 and the coding mode information D3 showing the coding mode selected in the motion detection unit 11 are inputted to the variable-length coding unit 16. These motion vector D2 and coding mode information D3 undergo the variable-length coding by the arithmetic coding using a predetermined probability table in the variable-length coding unit 16 similarly to the orthogonal transform coefficients D6, and then are multiplexed on the coded data D7.

Here, the setting of the probability table for use in the arithmetic coding in the variable-length coding unit 16 is the same as that described above regarding the image coding method shown in FIG. 5. A probability table different from that used for the arithmetic coding of the orthogonal transform coefficients D6 is usually used in the arithmetic coding of the motion vector D2 and the coding mode information D3. As to the probability table applied to the coding mode information D3, switching thereof is performed by referring to the processing results in the adjacent blocks as described above. Moreover, also in the arithmetic coding of the orthogonal transform coefficients D6, different probability tables may be used for the arithmetic coding of the luma blocks and for the arithmetic coding of the chroma blocks.

Furthermore, the orthogonal transform coefficients D6 generated in the orthogonal transform unit 14 and the quantization unit 15 are decoded by the inverse quantization unit 17 and the inverse orthogonal transform unit 18 in this image coding apparatus. Then, the decoded image data and the prediction frame image D4 are added together in the adder 19, and the locally decoded image D8 is generated. This locally decoded image D8 is stored in the frame memory 20, and is utilized for the motion compensation of other frame images.

Next, the image decoding method and the image decoding apparatus will be described.

Figure 9:
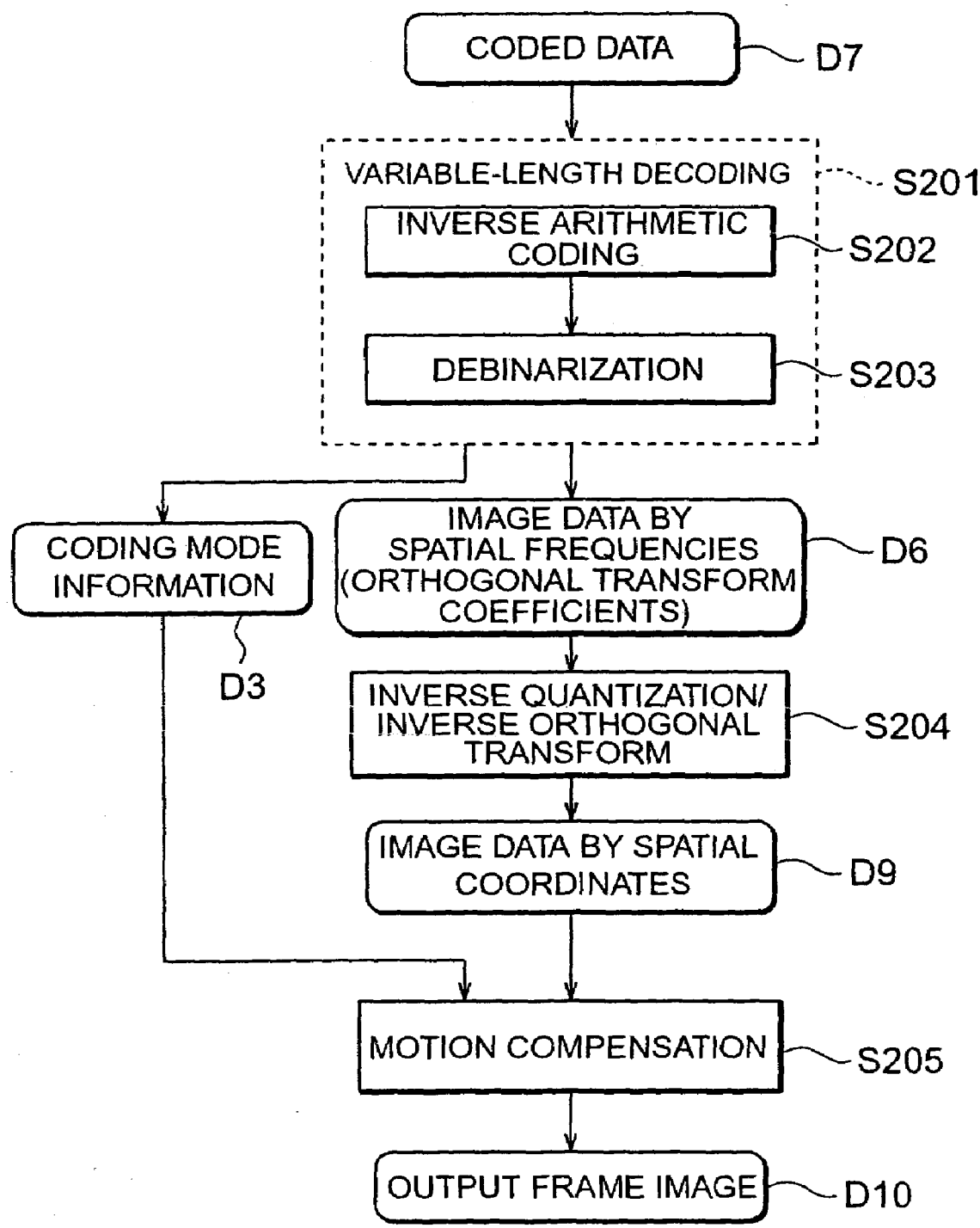
FIG. 9 is a flowchart schematically showing one embodiment of an image decoding method.

FIG. 9 is a flowchart schematically showing one embodiment of the image decoding method according to the present invention. This decoding method is an image decoding method, in which predetermined decoding and transform processing operations are carried out for the coded data D7 generated by the image coding method shown in FIG. 5, and an output frame image D10 is restored as an image corresponding to the input frame image D1.

In the image decoding method shown in FIG. 9, inverse variable-length decoding is performed for the coded data D7 by use of inverse arithmetic coding, and the plurality of orthogonal transform coefficients (quantization coefficient) D6 are generated (Step S201, decoding step). Moreover, the coding mode information D3 indicating the selected coding mode for the motion compensation is also decoded from the coded data D7 by use of the inverse arithmetic coding together with the orthogonal transform coefficients D6.

Specifically, the probability table applied to the coded data D7 is set to a predetermined probability table, and the coded data D7 undergoes the inverse arithmetic coding by use of this probability table (Step S202, inverse arithmetic coding step). Thus, the respective binarization patterns corresponding to the coding mode information D3 and the orthogonal transform coefficient D6 are generated. Then, the binarization patterns corresponding to the coding mode information D3 and the orthogonal transform coefficient D6 are debinarized by use of predetermined binarization tables, respectively, and the coding mode information D3 and the orthogonal transform coefficient D6 are generated (Step S203, debinarization step).

Herein, in the image decoding method of this embodiment, when the inverse arithmetic coding is performed for the coded data D7, coding modes selected in blocks adjacent the block to be coded are referred to for the respective binarization codes included in the binarization pattern corresponding to the coding mode information, and the probability tables applied to the binarization codes are switched.

Next, an inverse quantization operation and an inverse orthogonal transform operation are sequentially performed for the plurality of orthogonal transform coefficients D6, and a spatial image data D9 is generated (Step S204, inverse orthogonal transform step). Then, the motion compensation is performed by applying the coding mode indicated by the coding mode information D3 to the spatial image data D9, and an output frame image D10 is restored (Step S205, motion compensation step).

The effect of the image decoding method according to this embodiment will be described.

In the image decoding method shown in FIG. 9, the coding mode information D3 and the image data D6 are decoded by performing the inverse arithmetic coding and the debinarization for the coded data D7 subjected to the data compression. Thereafter, the motion compensation is performed by applying the coding mode indicated by the coding mode information D3. Then, in the inverse arithmetic coding of the coded data D7, the probability tables are switched while referring to the processing results in the adjacent blocks for the respective binarization codes included in the binarization pattern obtained by binarizing the coding mode information D3, and thus the inverse arithmetic coding is performed, similarly to the foregoing case of the arithmetic coding.

As described above, the context modeling, in which the probability tables are properly switched for the binarization codes in the binarization patterns corresponding to the coding mode information, is performed, whereby the respective code positions of the binarization codes in the binarization pattern and the coding mode selected in the adjacent block are properly reflected on the decoding condition in the inverse arithmetic coding. Accordingly, the redundancy of the coding mode information D3 is effectively removed, and the data can be suitably restored from the coded data D7 showing the enhanced efficiency of the data compression.

Figure 10:
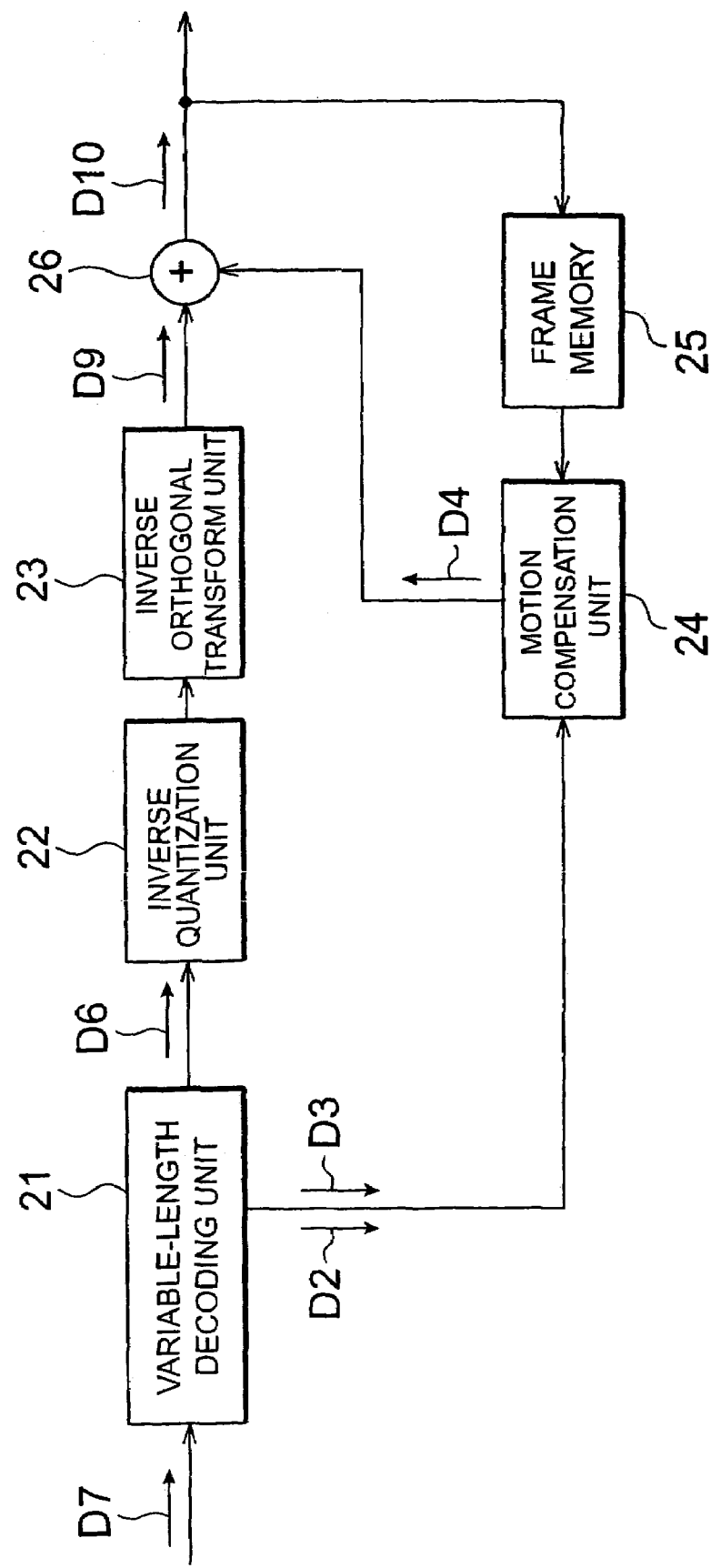
FIG. 10 is a block diagram illustrating a constitution of one embodiment of an image decoding apparatus.

FIG. 10 is a block diagram showing a constitution of one embodiment of the image decoding apparatus according to the present invention.

The coded data D7 to be inputted as an object to be decoded is inputted to a variable-length decoding unit (decoding means) 21 and undergoes the variable-length decoding by the inverse arithmetic coding using a predetermined probability table, and thus the plurality of orthogonal transform coefficients D6 are generated. For the coded data D7 subjected to the data compression, the variable-length decoding unit 21 detects a synchronization word indicating the header of the frame image, then decodes each piece of data included in the coded data D7 for each macroblock, and generates the orthogonal transform coefficients D6 as the frequency image data, the motion vector D2, the coding mode information D3 and the like. Note that the probability table for use in the arithmetic coding is appropriately switched as described above.

The orthogonal transform coefficients D6 decoded in the variable-length decoding unit 21 undergo the inverse quantization and the inverse orthogonal transform by an inverse quantization unit 22 and an inverse orthogonal transform unit (inverse orthogonal transform means) 23. Thus, a restored difference frame image D9 as the spatial image data is generated. This restored difference frame image D9 is a frame image corresponding to the difference frame image D5 prior to the coding.

On the other hand, the motion vector D2 and the coding mode information D3 are inputted to a motion compensation unit 24. In the motion compensation unit 24, the motion compensation of the image is performed according to the coding mode indicated by the coding mode information D3, and the prediction frame image D4 is generated by use of the motion vector D2 from the variable-length decoding unit 21 and other frame images stored in a frame memory 25. Then, in an adder 26, a restored difference frame image D9 and the prediction frame image D4 are added, and a restored frame image is outputted as an output frame image D10.

Here, processing activities of the image coding method executed in the above image coding apparatus are feasible by an image coding program for causing a computer to execute the image coding. Further, processing activities of the image decoding method executed in the above image decoding apparatus are feasible by an image decoding program for causing a computer to execute the image decoding.

For example, the image coding apparatus can be configured by using a CPU, a ROM connected to the CPU and storing respective software programs necessary for processing operations of the image coding, and a RAM connected to the CPU and temporarily storing data during execution of the program. In this configuration, the image coding apparatus is realized by executing the specific image coding program by the CPU.

Similarly, the image decoding apparatus can be configured by using a CPU, a ROM connected to the CPU and storing respective software programs necessary for processing operations of the image decoding, and a RAM connected to the CPU and temporarily storing data during execution of the program. In this configuration, the image decoding apparatus is realized by executing the specific image decoding program by the CPU.

Moreover, the foregoing program for allowing the CPU to execute the respective processing for image coding or image decoding is distributable by being recorded in a computer-readable record medium. Such a record medium includes, for example: a magnetic medium such as a hard disc, a flexible disk and the like; an optical medium such as a CD-ROM, a DVD-ROM and the like; a magneto-optical medium such as a floptical disk and the like; a hardware device such as, for example, a RAM, a ROM, a semiconductor nonvolatile memory and the like, which is specially disposed so as to execute or store program instructions; and the like.

Further, the foregoing program for causing the computer to execute the image coding-or image decoding can be made into a computer data signal embodied in carrier wave. Accordingly, the image coding program or image decoding program can be carried through the cable or wireless carrying path or the like.

Procedures of the arithmetic coding (variable-length coding) for the image data and the coding mode information and preferable coding conditions thereof in the image coding method and the image coding apparatus shown in FIGS. 5 and 6 will be described while showing an ITU-T H.26L coding method as a specific example. Note that the coding method and coding conditions described below can be similarly applied to the image decoding method and the image decoding apparatus shown in FIGS. 9 and 10. Furthermore, a specific coding method is not limited to the foregoing H.26L coding method.

Figures 11A, 11B, 11C, 11D:
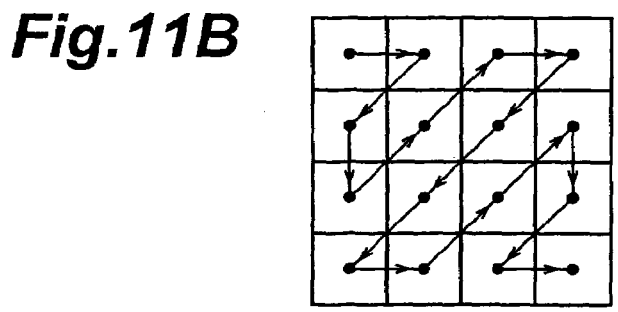
FIGS. 11A to 11D are diagrams illustrating arithmetic coding of DCT coefficients.

First, the procedures of the arithmetic coding for the orthogonal transform coefficient that is image data will be described with reference to FIGS. 11A to 11D. Herein, DCT is supposed as orthogonal transform to transform spatial image data to frequency image data. FIG. 11A shows one example of specific numerical values of DCT coefficients (quantization coefficient) $f_{11}$ to $f_{44}$ with a size of 4×4 shown in FIG. 8B. In the variable-length coding unit of the image coding apparatus, the arithmetic coding is performed for the DCT coefficients according to a predetermined processing procedure, and the coded data is generated.

In the DCT coefficients $f_{11}$ to $f_{44}$, index values i and j of the coefficients $f_{ij}$ express vertical and horizontal frequencies corresponding thereto, respectively. Unlike the image components $a_{11}$ to $a_{44}$ in the spatial image data (refer to FIG. 8A), each of the DCT coefficients has data characteristics depending on the value of the spatial frequency corresponding to the size of the coefficient value thereof. Generally, in a natural image, a large orthogonal transform coefficient value is obtained in a low frequency range, and the coefficient value becomes smaller as the frequency becomes higher.

In the processing procedure of the arithmetic coding for the DCT coefficients, the DCT coefficients $f_{11}$ to $f_{44}$ which are two-dimensional data are transformed into one-dimensional data by a zigzag scan shown in FIG. 11B. In this zigzag scan, the DCT coefficients are scanned so that the one-dimensional data after the scan forms a data string changes from a low frequency range to a high frequency range. Thus, the one dimensional-data shown in FIG. 11C, in which the DCT coefficients are arranged from the low frequency range to the high frequency range, is obtained.

This one-dimensional data of the DCT coefficients is further transformed into data composed of "Level" and "Run", which is shown in FIG. 11D, in order to decrease a data amount thereof. Here, the "Level" represents coefficient levels in the DCT coefficients having coefficient values that are not 0 among the plurality of DCT coefficients. Moreover, the "Run" represents run lengths as the numbers of data of which coefficient values are 0, the data being located immediately before the DCT coefficients that are not 0.

For example, in the data example of the DCT coefficients, which is shown in FIG. 11A, sixteen DCT coefficients $f_{11}$ to $f_{44}$ are partitioned into: the coefficient group $s_1$ composed of the coefficient $f_{11}$; the coefficient group $s_2$ composed of the coefficients $f_{12}$ and $f_{21}$; the coefficient group $s_3$ composed of the coefficients $f_{31}$ to $f_{13}$; the coefficient group $s_4$ composed of the coefficients $f_{14}$ to $f_{32}$; and the coefficient group $s_5$ composed of the coefficients $f_{41}$ to $f_{44}$, based on the appearing positions of the DCT coefficients having coefficient values that are not 0 as shown in FIG. 11C.

Then, as shown in FIG. 11D, the Level and Run values are obtained for these coefficient groups $s_1$ to $s_5$, respectively. Specifically, in the coefficient group $s_1$, the Level value is $f_{11}=10$, and the Run value is 0. In the coefficient group $s_2$, the Level value is $f_{21}=2$, and the Run value is 1. In the coefficient group $s_3$, the Level value is $f_{13}=-1$, and the Run value is 2. In the coefficient group $s_4$, the Level value is $f_{32}=1$, and the Run value is 2.

Moreover, the final coefficient group $s_5$ is a coefficient group in which the coefficient values of the entire coefficients $f_{41}$ to $f_{44}$ are 0. The coefficient group $s_5$ becomes an EOB (end of block) of valid data in the DCT coefficients shown in FIG. 11A. Accordingly, in this coefficient group $s_5$, 0 denoting the EOB symbol is taken as the Level value.

The data composed of the "Level" and the "Run", which are shown in FIG. 11D, is binarized by use of a predetermined binarization table, and a binarization pattern to be subjected to the arithmetic coding is prepared. When each of the data Level and data Run is binarized, these data undergoes the arithmetic coding by use of a predetermined probability table in the order of Level of $s_1$, Run of $s_1$, Level of $s_2$, Run of $s_2$, . . . and Level of $s_5$, and the code word that is coded data corresponding to the orthogonal transform coefficients of FIG. 11A is generated.

Next, a procedure of the arithmetic coding for the coded data information indicating the coded data which is selected for the motion compensation will be described with reference to FIGS. 12 to 15. Herein, as the plurality of coding modes prepared for the motion compensation, the ten coding modes 0 to 9 shown in FIGS. 7A to 7J, that is, one skip mode 0, seven inter-modes 1 to 7 and two intra-modes 8 and 9 are supposed.

The plurality of coding modes shown in FIGS. 7A to 7J are set so as to include the skip mode for copying the image at the same position as the reference frame used for motion compensation, and two or more coding modes in which the motion compensation is performed and a partitioning method of the image in the block to motion compensation blocks is different from others. As described above, the block to be coded is partitioned into one or more blocks as the motion compensation blocks, and a motion vector is given to each of the partitioned motion compensation blocks.

The probability table is switched for the motion compensation block as described above with reference to the coding mode selected in the block adjacent thereto from the plurality of coding modes shown in FIGS. 7A to 7J, which include two or more coding modes different in block partition. Thus, redundancy of the coded data is reduced in accordance with motion compensation conditions including the partitioning method of the motion compensation block, thus further enhancing the efficiency of the data compression. Note that, as for the skip mode, the plurality of coding modes may not include a skip mode.

As to the ten coding modes 0 to 9 shown in FIGS. 7A to 7J, in the variable-length coding of the coding mode information for specifying which coding mode is selected, the coding mode information is first binarized by use of a predetermined binarization table, and a binarization pattern which is a direct object of the arithmetic coding is prepared. FIG. 12 is a table showing an example of the binarization table which is used for binarization of the coding mode information showing the coding modes showing in FIGS. 7A to 7J.

When the coding mode information is binarized, the binarization pattern obtained undergoes the arithmetic coding by use of a predetermined probability table, and a code word that is coded data corresponding to the coding mode information is generated. Herein, with respect to the probability table applied to the arithmetic coding of the coding mode information, a different probability table may be used for each code position (Bin_no. shown in FIG. 12) of the binarization code included in the binarization pattern. Alternatively, a common probability table may be used for each code position.

Furthermore, in the image coding method and the image coding apparatus shown in FIGS. 5 and 6, the arithmetic coding of the coding mode information is performed in such a manner that by referring to which coding mode among the plurality of coding modes is selected in the adjacent block of the block to be coded, the probability table is switched for each binarization code included in the binarization pattern of the coding mode information.

Herein, when the seven inter-modes 1 to 7, in which the partitioning methods of the motion compensation block are different from each other, are considered among the ten coding modes shown in FIGS. 7A to 7J, which coding mode is selected among these inter-modes depends on a degree of the detected motion of the image.

For example, in an image area in which a motion of a background is simple in the frame image, the motion compensation can be sufficiently performed by giving a motion vector to the entire block. Accordingly, in this case, an inter-mode such as the mode 1 with a size of 16×16, in which the number of block sections are small, is selected. On the other hand, in an image area in which the motion is complicated and intense, it is necessary to perform the motion compensation by giving the motion vector minutely. Accordingly, in this case, an inter-mode such as the mode 7 with a size of 4×4, in which the number of block sections is large, is selected, or an intra-mode is selected.

In many cases, the image area in which the motion in such an image is simple or complicated is one extending over a plurality of macroblocks. Therefore, if an inter-mode, in which the number of motion compensation block sections is small, is selected in a certain block, there is a high possibility that an inter-mode in which the number of block sections is small is selected in adjacent blocks. The same can be said for coding modes in which the number of the block sections is large. Specifically, a certain correlation of a selected coding mode between the adjacent blocks exists.

If the arithmetic coding is performed in such a manner that the characteristic of coding mode selection is used and the probability table applied to the coding mode information is switched by referring to the selection result of the coding mode in the adjacent block, the redundancy of the coding mode information can be effectively removed, and the efficiency of data compression in the coded data can be enhanced.

Figure 13:
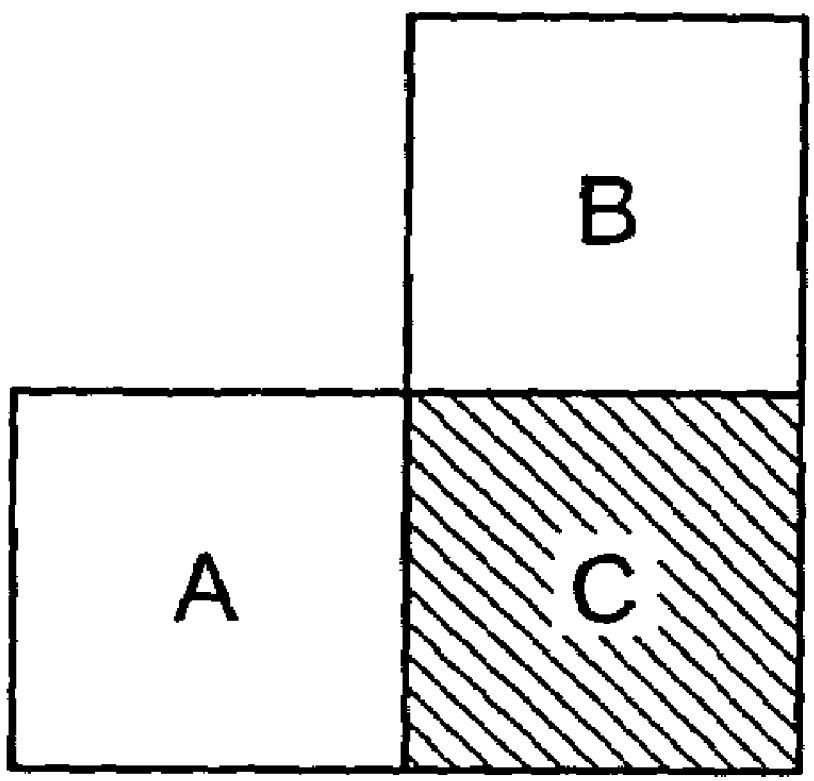
FIG. 13 is a diagram illustrating context modeling, in which blocks A and B adjacent to a block C to be coded are referred to for the block C.

With respect to switching of the probability table, as shown in FIG. 13, specifically, there is a method in which a block A adjacent to the left side of a block C to be coded and a block B placed on the upper side of the block C are considered relative to the block C, and processing results in these adjacent blocks A and B are referred to.

Figure 4:
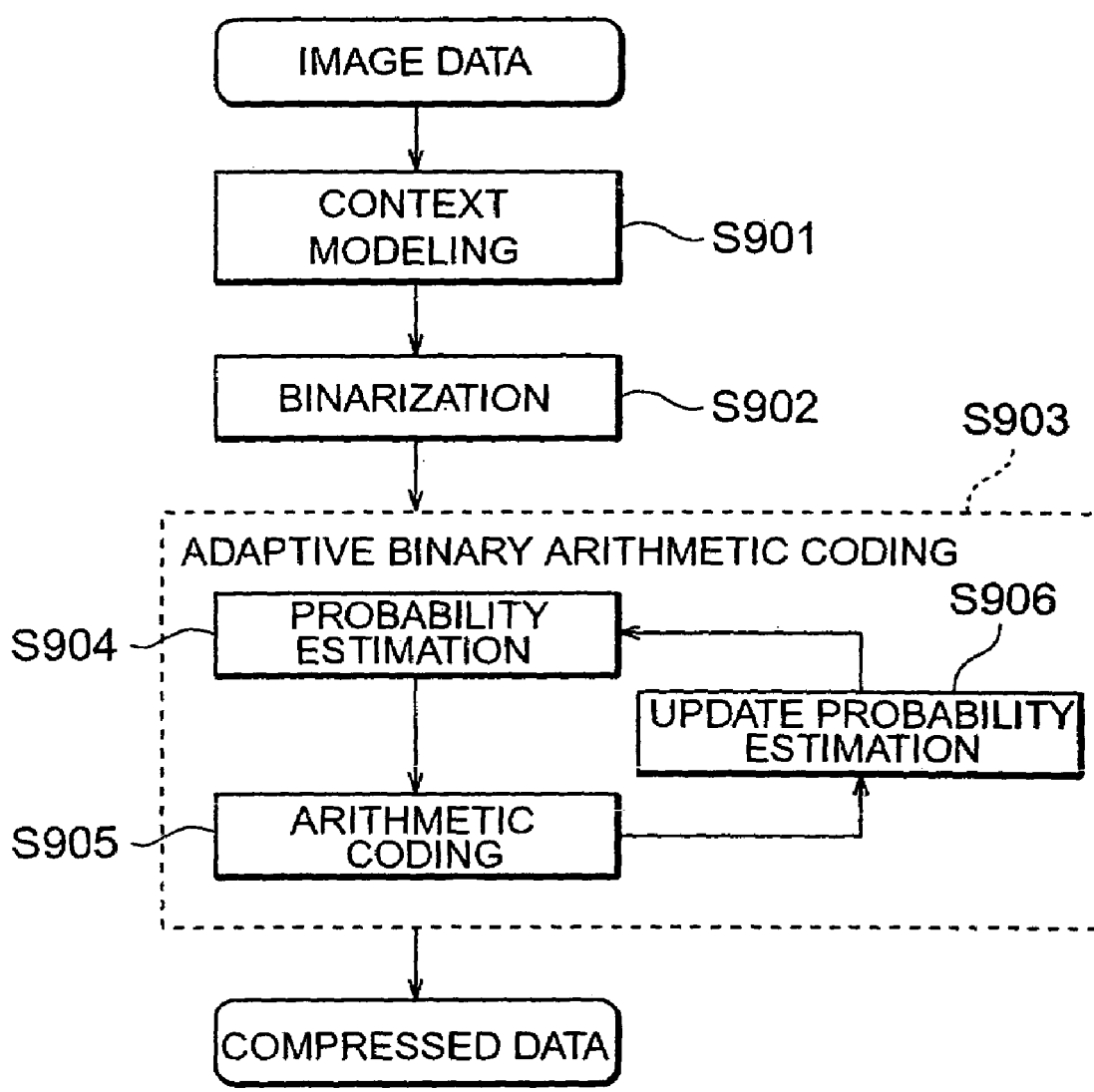
FIG. 4 is a flowchart showing an example of an image coding method using the arithmetic coding.

Specifically, with reference to the selected coding modes in the adjacent blocks A and B, the probability tables applied to the respective binarization codes included in the binarization pattern of the coding mode information in the block C are switched. The switching of the probability table by such a context modeling can be performed, for example, by a coding method (CABAC) using the context modeling shown in FIG. 4.

Furthermore, as the method for referring the processing result in the adjacent block, the coding mode selected in the adjacent block may be directly referred to.

Alternatively, a method may adopted, in which a complexity is previously set for each of the plurality of coding modes prepared for the motion compensation, and the probability table is switched by referring to the complexity corresponding to the coding mode selected in the adjacent block. As described above, by setting the complexity for the respective coding modes previously, conditions such as the coding mode selected in the adjacent block can be suitably reflected on the coding conditions in the arithmetic coding.

FIG. 14 is a table showing an example of the complexity which is set for the respective coding modes shown in FIGS. 7A to 7J. In the setting example shown in FIG. 14, the complexities 0 to 7 for the respective coding modes are set depending on the skip mode, the inter-mode and the intra-mode and based on the difference of the number of the sections of the motion compensation blocks, so that the complexity becomes higher as the numeral suffixed to the complexity becomes larger.

Specifically, the complexity of the skip mode 0 is set to 0; the complexity of the intra-mode 9 in which the number of the sections is 1 is set to 1; the complexity of the inter-mode 1 in which the number of the sections is 1 is set to 2; the complexity of the inter-modes 2 and 3 in which the number of the sections is 2 is set to 3; the complexity of the inter-mode 4 in which the number of the sections is 4 is set to 4; the complexity of the inter-modes 5 and 6 in which the number of the sections is 8 is set to 5; the complexity of the inter-mode 7 in which the number of the sections is 16 is set to 6; and the complexity of the intra-mode 8 in which the number of the sections is 16 is set to 7.

However, the complexity for the respective coding modes can be set by the style other than that shown in FIG. 14. For example, in the example of FIG. 14, a same complexity is set for the mode 2 (FIG. 7C) in which the block partition is performed with the horizontal direction, and for the mode 3 (FIG. 7D) in which the block partition is performed with the vertical direction. On the other hand, different complexities can be set depending on the partitioning direction. This is same for the other modes in addition to the modes 2 and 3. Moreover, the complexity can be set with reference to other conditions in addition to the partitioning direction.

Figure 15:
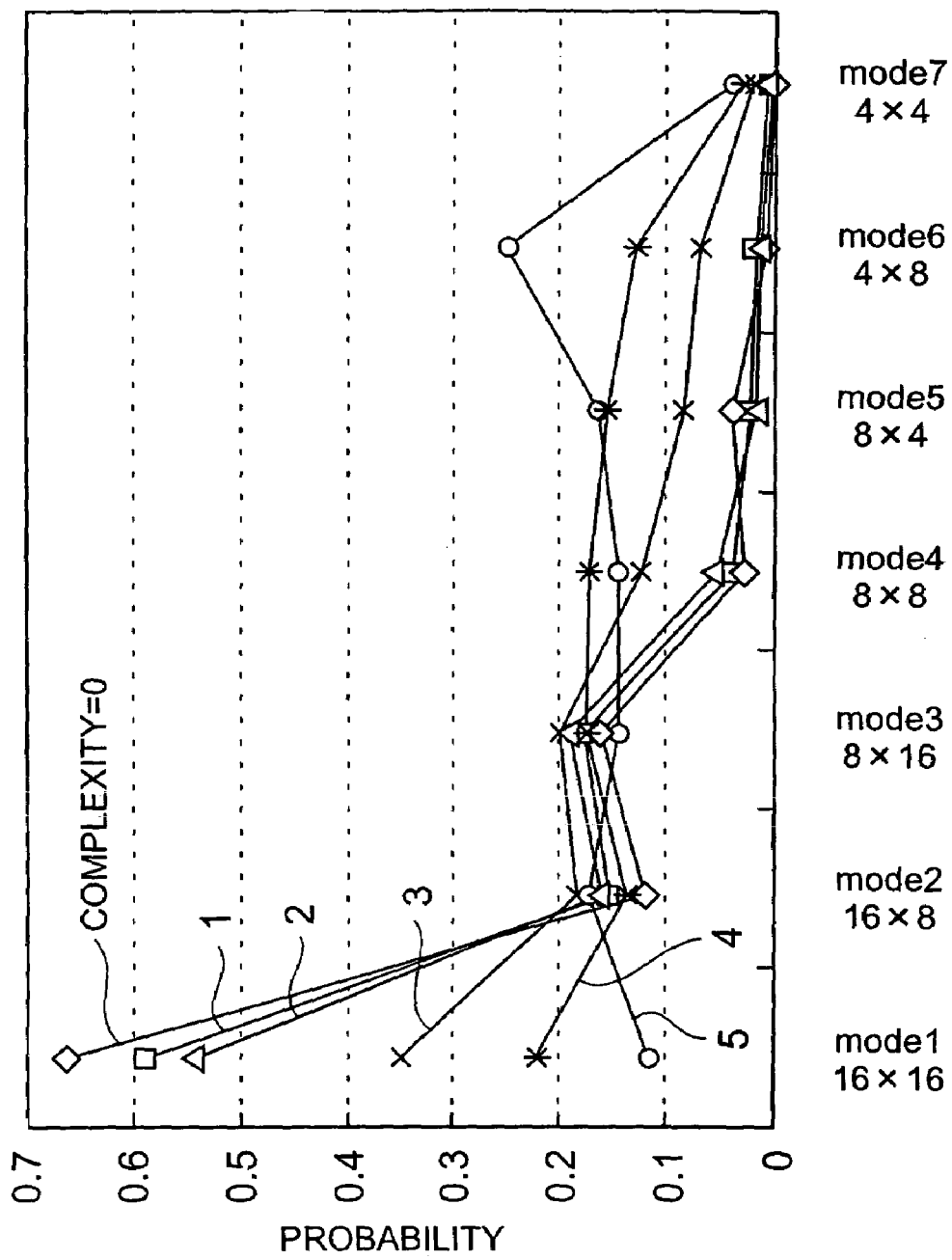
FIG. 15 is a graph showing correlations between complexities corresponding to coding modes selected in the adjacent blocks and coding modes selected in blocks to be coded.

FIG. 15 is a graph showing a correlation between the complexity corresponding to the coding mode selected in the adjacent block and the coding mode selected in the block to be coded. In this graph, the horizontal axis indicates the coding mode selected in the block to be coded. Note that the illustration is made for the coding modes 1 to 7 of the inter-mode in the graph. Moreover, the vertical axis indicates the probability that each coding mode is selected.

Specifically, in each graph shown in FIG. 15, attention is paid to the average value of the complexities of the coding modes selected in the adjacent blocks A and B in the method for referring the adjacent block shown in FIG. 13. Then, as to the case where the average values of the complexities in the adjacent blocks A and B are 0, 1, 2, 3, 4 and 5 in the setting of the complexity shown in FIG. 14, the graphs of the selection probability of the coding mode selected in the block C are shown.

As shown in the graph of FIG. 15, when the complexity of the coding mode selected in the adjacent block is as low as 0 to 2, a probability of selecting the inter-mode 1 in which the number of the sections is small becomes large in the block to be coded. On the contrary, when the complexity of the coding mode selected in the adjacent block is as high as 3 to 5, the probability of selecting the inter-mode 1 in which the number of the sections is small becomes low in the block to be coded. When such a correlation of the coding modes selected in the blocks adjacent to each other is used, the probability table for each binarization code included in the binarization pattern of the coding mode information is switched, whereby the redundancy of the coding mode information can be removed.

FIG. 16 is a table showing a reduction effect of a coding amount by switching of the probability table for the binarization code of the foregoing coding mode information. In this table, shown are: a coding amount when an image is coded using CABAC by the conventional H.26L coding method; a coding amount when the image is coded by use of the method of the present invention in which the probability table for each binarization code in the binarization pattern of the coding mode information is switched; and a decrease ratio of the coding amount by use of the method for switching the probability table.

Herein, as to the image data to be coded for the decrease ratio of the coding amount and a quantization parameter QP used for the image coding, the image coding was performed under three conditions: (a) QP=24 with a test image "Foreman", (b) QP=24 with a test image "Stefan", and (c) QP=16 with the test image "Stefan"

As shown in the table of FIG. 16, the reduction effect of the coding amount by the switching of the probability table can be obtained in the entire image coding under the three conditions.

In the foregoing image coding method and the image coding apparatus, as to the switching of the probability table for each binarization code included in the binarization pattern of the coding mode information, the probability table is switched not only for the binarization code of, for example, Bin_no. 1 (code position 1, see FIG. 12) but also for the respective binarization codes included in the binarization pattern.

For example, in the binarization table shown in FIG. 12, the pattern lengths of the binarization patterns differ depending on the selected coding mode. On the contrary, whichever coding mode is selected among the plurality of coding modes, by switching the probability table for the respective binarization codes, the efficiency of the data compression in the coding mode can be increased. However, the probability table may be switched for the whole of the plurality of binarization codes or alternatively for the individual binarization codes.

Herein, as to the switching of the probability table applied to the binarization code, the probability table should be preferably switched in consideration for the correlation between the code position (Bin_no.) of the binarization code in the binarization pattern and the coding mode discriminated by the binarization code. As described above, the probability table is switched in consideration for the correlation between the binarization codes included in the binarization pattern and the coding mode in accordance with each of the code position thereof, whereby the conditions such as the coding mode selected in the adjacent block can be suitably reflected on the coding conditions in the arithmetic coding.

A specific example of the method for switching such a probability table will be described with reference to FIG. 17. FIG. 17 is a table showing another example of the binarization table used for binarization of the coding mode information showing the coding modes shown in FIGS. 7A to 7J.

In the binarization pattern in the binarization table shown in FIG. 17, the binarization code of Bin_no. 1 that is the first bit is a bit indicating whether the coding mode is the skip mode 0 or the modes 1 to 9 other than the skip mode 0. Accordingly, for the above bit, the three probability tables are switched, for example, depending on whether the adjacent blocks A and B are the skip mode 0.

Furthermore, when the first bit is "1", the binarization code of Bin_no. 2 that is the second bit is a bit indicating whether the coding mode is the inter-mode 1 with a size of 16×16 or the modes 2 to 9 other than the inter-mode 1. Accordingly, for the above bit, the probability table is switched depending on whether the adjacent blocks are the skip mode 0, the inter-mode 1 with a size of 16×16, or a mode other than these modes. Note that, since the inter-mode 1 with a size of 16×16 is frequently generated in an image portion such as a background where a motion is relatively simple, and in an image portion where a motion is a little, the inter-mode 1 shows a high correlation with the skip mode 0.

Specifically, for example, as to the mode in the adjacent block A or B, the skip mode 0, the inter-mode 1 with a size of 16×16, and the condition of outside of the screen are set at 0, and set at 1 otherwise. Depending on the size of A+B in the above-described cases, the three probability tables are switched. When A+B =0 is established, a probability table is selected, in which a probability that the bit is set at 0 is large. When A+B=2 is established, a probability table is selected, in which a probability that the bit is set at 1 is large. Note that it is also possible to apply the method as described above to bits from the third bit and on similarly.

When the second bit is "1", the binarization code of Bin_no. 3 that is the third bit is a bit indicating whether the coding mode is the inter-mode 2 with a size of 16×8, the inter-mode 3 with a size of 8×16 or any of the modes 4 to 9 other than the above. Accordingly, for the above bit, a probability table different from those for the first and second bits is used.

Moreover, when the third bit is "1", the binarization code of Bin_no. 4 that is the fourth bit is a bit indicating whether the coding mode is any of the inter-modes 4 to 7 or any of the intra-modes 8 and 9. Accordingly, for the above bit, a probability table different from those for the first, second and third bits is used.

Moreover, bits other than the ones described above are bits for use in finely identifying the coding mode information broadly divided by the first to fourth bits. Two bits are used in the inter-modes 4 to 7, and one bit is used in the intra-modes 8 and 9. For example, the same probability table is used for these bits entirely.

Figure 18:
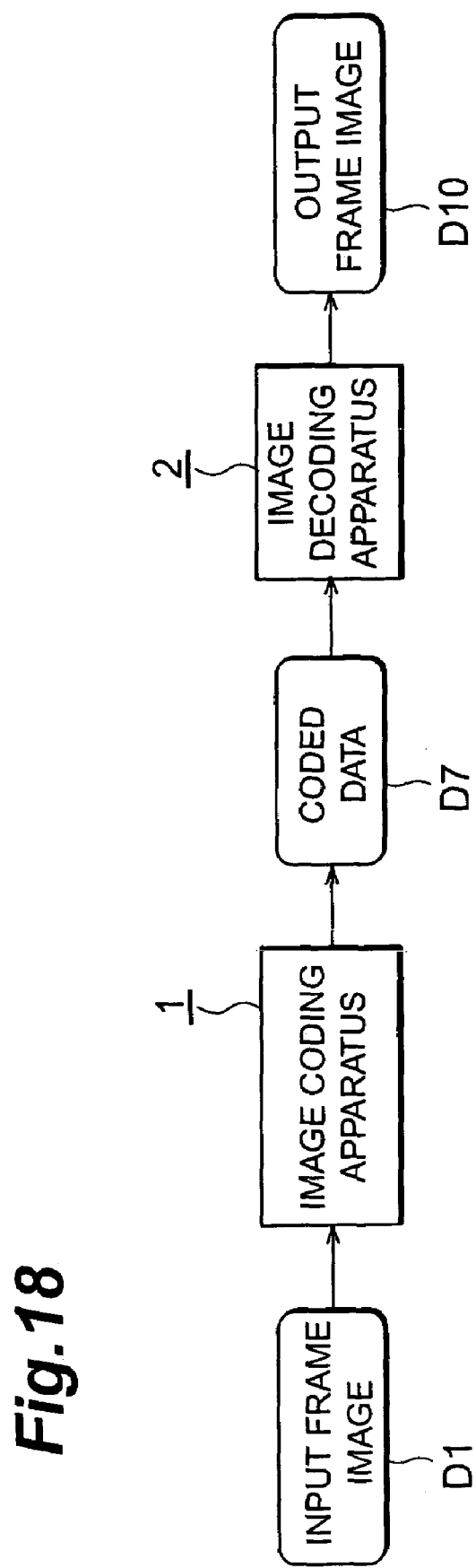
FIG. 18 is a schematic diagram illustrating a constitution of one embodiment of an image transmission system.

FIG. 18 is a schematic diagram illustrating a constitution of one embodiment of an image transmission system (for example, a mobile video transmission system) according to the present invention. This image transmission system is constituted by including: the image coding apparatus (for example, the image coding apparatus shown in FIG. 6) 1 that realizes the image coding method shown in FIG. 5; and the image decoding apparatus (for example, the image decoding apparatus shown in FIG. 10) 2 that realizes the image decoding method shown in FIG. 9.

In this system, the input frame image D1 is coded in the image coding apparatus 1, the coded data D7 is generated, and the coded data D7 is outputted to a predetermined wired or radio transmission path. Then, the coded data D7 transmitted from the image coding apparatus 1 through the transmission path is inputted to the image decoding apparatus 2, and is restored as an output frame image D10.

According to the image transmission system as described above, the image can be transmitted efficiently by use of the coded data in which the efficiency of the data compression for the coding mode information multiplexed thereto.

INDUSTRIAL APPLICABILITY

As described above in detail, the image coding method, image decoding method, image coding apparatus, image decoding apparatus, program, computer data signal, and image transmission system of the present invention are applicable as a method and apparatus and the like which can enhance efficiency of data compression for coding mode information multiplexed with coded data.

Namely, the code positions of the binarization codes in the binarization pattern, the coding modes selected in the adjacent blocks and the like are suitably reflected on the coding conditions in the arithmetic coding according to the configuration, in which the coding modes selected in the blocks adjacent to the block to be coded are referred to, and the probability table for use in the arithmetic coding is switched for each of the binarization codes included in the binarization pattern corresponding to the coding mode information in the variable-length coding or decoding between the coding mode information and the coded data. Accordingly, the redundancy of the coding mode information is removed effectively, thus making it possible to enhance the efficiency of the data compression in the coded data.

The invention claimed is:

1. An image coding method, in which a frame image is divided into blocks of a predetermined size and image data is coded for each of the blocks, the method comprising:
   a motion compensation step of performing motion compensation for the image data, in which a motion of an image in the block is detected in comparison of image data thereof with image data in another block in any of the frame image and another frame image, and a coding mode to be applied to the image data is selected among a plurality of coding modes prepared for the motion compensation; and
   a coding step of generating coded data, in which coding mode information representing the selected coding mode and the image data are binarized by use of a predetermined binarization table to generate a binarization pattern, and the binarization pattern undergoes variable-length coding by arithmetic coding using a predetermined probability table,
   wherein, in the coding step, the probability table to be applied to each of binarization codes included in the binarization pattern corresponding to the coding mode information is switched with reference to a coding mode selected in a block adjacent to the block and a complexity corresponding to the coding mode selected in the adjacent block, the complexity set for each of the plurality of coding modes.

2. The image coding method according to claim 1, wherein the plurality of coding modes include two or more coding modes of performing the motion compensation, the coding modes having mutually different methods for partitioning the image in the block into motion compensation blocks.

3. The image coding method according to claims 1, wherein the plurality of coding modes include a skip mode of copying an image at the same position as a reference frame for use in the motion compensation.

4. The image coding method according to claim 1, wherein, in the coding step, the probability table is switched in consideration of a correlation between a code position of the binarization code in the binarization pattern and the coding mode distinguished by the binarization code.

5. An image decoding method, in which a frame image is divided into blocks of a predetermined size and coded data obtained by coding image data for each of the blocks is decoded, the method comprising:
   a decoding step of generating coding mode information and image data of an image in the block, in which the coded data undergoes variable-length decoding by inverse arithmetic coding using a predetermined probability table to generate a binarization pattern, and the binarization pattern is debinarized by use of a predetermined binarization table; and
   a motion compensation step of performing motion compensation for the image data, in which a coding mode selected among a plurality of coding modes prepared for the motion compensation is applied to the image data, the coding mode being represented by the coding mode information;
   wherein, in the decoding step, the probability table to be applied to each of binarization codes included in the binarization pattern corresponding to the coding mode information is switched with reference to a coding mode selected in a block adjacent to the block and a complexity corresponding to the coding mode selected in the adjacent block, the complexity set for each of the plurality of coding modes.

6. The image decoding method according to claim 5, wherein the plurality of coding modes include two or more coding modes of performing the motion compensation, the coding modes having mutually different methods for partitioning the image in the block into motion compensation blocks.

7. The image decoding method according to claim 5, wherein the plurality of coding modes include a skip mode of copying an image at the same position as a reference frame for use in the motion compensation.

8. The image decoding method according to claim 5, wherein, in the decoding step, the probability table is switched in consideration of a correlation between a code position of the binarization code in the binarization pattern and the coding mode distinguished by the binarization code.

9. An image coding apparatus, in which a frame image is divided into blocks of a predetermined size and image data is coded for each of the blocks, the apparatus comprising:
   motion compensation means for performing motion compensation for the image data, in which a motion of an image in the block is detected in comparison of image data thereof with image data in another block in any of the frame image and another frame image, and a coding mode to be applied to the image data is selected among a plurality of coding modes prepared for the motion compensation; and
   coding means for generating coded data, in which coding mode information representing the selected coding mode and the image data are binarized by use of a predetermined binarization table to generate a binarization pattern, and the binarization pattern undergoes variable-length coding by arithmetic coding using a predetermined probability table,
   wherein the coding means switches the probability table to be applied to each of binarization codes included in the binarization pattern corresponding to the coding mode information with reference to a coding mode selected in a block adjacent to the block and a complexity corresponding to the coding mode selected in the adjacent block, the complexity set for each of the plurality of coding modes.

10. The image coding apparatus according to claim 9, wherein the plurality of coding modes include two or more coding modes of performing the motion compensation, the coding modes having mutually different methods for partitioning the image in the block into motion compensation blocks.

11. The image coding apparatus according to claim 9, wherein the plurality of coding modes include a skip mode of copying an image at the same position as a reference frame for use in the motion compensation.

12. The image coding apparatus according to claim 9, wherein the coding means switches the probability table in consideration of a correlation between a code position of the binarization code in the binarization pattern and the coding mode distinguished by the binarization code.

13. An image decoding apparatus, in which a frame image is divided into blocks of a predetermined size and coded data obtained by coding image data for each of the blocks is decoded, the apparatus comprising:
   decoding means for generating coding mode information and image data of an image in the block, in which the coded data undergoes variable-length decoding by inverse arithmetic coding using a predetermined probability table to generate a binarization pattern, and the binarization pattern is debinarized by use of a predetermined binarization table; and motion compensation means for performing motion compensation for the image data, in which a coding mode selected among a plurality of coding modes prepared for the motion compensation is applied to the image data, the coding mode being represented by the coding mode information;

wherein the decoding means switches the probability table to be applied to each of binarization codes included in the binarization pattern corresponding to the coding mode information with reference to a coding mode selected in a block adjacent to the block and a complexity corresponding to the coding mode selected in the adjacent block, the complexity set for each of the plurality of coding modes.

14. The image decoding apparatus according to claim 13, wherein the plurality of coding modes include two or more coding modes of performing the motion compensation, the coding modes having mutually different methods for partitioning the image in the block into motion compensation blocks.

15. The image decoding apparatus according to claim 13, wherein the plurality of coding modes include a skip mode of copying an image at the same position as a reference frame for use in the motion compensation.

16. The image decoding apparatus according to claim 13, wherein the decoding means switches the probability table in consideration of a correlation between a code position of the binarization code in the binarization pattern and the coding mode distinguished by the binarization code.

17. A computer readable storage medium encoded with an image coding program for causing a computer to execute the image coding method of claim 1.

18. A computer readable storage medium encoded with an image decoding program for causing a computer to execute the image decoding method of claim 5.

19. An image transmission system, in which a frame image is divided into blocks of a predetermined size, and the frame image is transmitted by coded data obtained by coding image data for each of the blocks, the system comprising:

the image coding apparatus of generating the coded data from the frame image and outputting the coded data, according to claim 9; and an image decoding apparatus receiving the coded data from the image coding apparatus and restoring the frame image.

20. The image coding method according to claim 1, wherein the complexity is set depending on a skip mode, an inter-mode and an intra-mode.

21. The image coding method according to claim 1, wherein the complexity is set based on a number of sections of the motion compensation blocks.

22. The image coding method according to claim 1, wherein the complexity is set depending on a partitioning direction of the block.

23. The image decoding method according to claim 5, wherein the complexity is set depending on a skip mode, an inter-mode and an intra-mode.

24. The image decoding method according to claim 5, wherein the complexity is set based on a number of sections of the motion compensation blocks.

25. The image decoding method according to claim 5, wherein the complexity is set depending on a partitioning direction of the block.

26. The image coding apparatus according to claim 9, wherein the complexity is set depending on a skip mode, an inter-mode and an intra-mode.

27. The image decoding method according to claim 9, wherein the complexity is set based on a number of sections of the motion compensation blocks.

28. The image coding apparatus according to claim 9, wherein the complexity is set depending on a partitioning direction of the block.

29. The image decoding apparatus according to claim 13, wherein the complexity is set depending on a skip mode, an inter-mode and an intra-mode.

30. The image decoding method according to claim 13, wherein the complexity is set based on a number of sections of the motion compensation blocks.

31. The image decoding apparatus according to claim 13, wherein the complexity is set depending on a partitioning direction of the block.

* * * * *